(12) United States Patent
Dannecker et al.

(10) Patent No.: US 9,977,847 B2
(45) Date of Patent: May 22, 2018

(54) EFFICIENT FORECASTING FOR HIERARCHICAL ENERGY SYSTEMS

(71) Applicants: Lars Dannecker, Dresden (DE); Robert Lorenz, Hamburg (DE); Philipp Roesch, Dresden (DE)

(72) Inventors: Lars Dannecker, Dresden (DE); Robert Lorenz, Hamburg (DE); Philipp Roesch, Dresden (DE)

(73) Assignee: SAP SE, Walldorf (DE)

( * ) Notice: Subject to any disclaimer, the term of this patent is extended or adjusted under 35 U.S.C. 154(b) by 1108 days.

(21) Appl. No.: 14/170,354

(22) Filed: Jan. 31, 2014

(65) Prior Publication Data
US 2015/0120269 A1    Apr. 30, 2015

Related U.S. Application Data

(60) Provisional application No. 61/895,347, filed on Oct. 24, 2013, provisional application No. 61/895,346, filed on Oct. 24, 2013.

(51) Int. Cl.
*G06G 7/54*    (2006.01)
*G06F 17/50*   (2006.01)
*G06Q 50/06*   (2012.01)

(52) U.S. Cl.
CPC ........ *G06F 17/5009* (2013.01); *G06Q 50/06* (2013.01); *G06F 2217/78* (2013.01); *Y02E 60/76* (2013.01); *Y04S 10/60* (2013.01); *Y04S 40/22* (2013.01)

(58) Field of Classification Search
CPC . G06F 17/5009; G06F 2217/78; G06Q 50/06; Y04S 10/60; Y04S 40/22; Y02E 60/76

USPC ........................................................ 703/18
See application file for complete search history.

(56) References Cited

U.S. PATENT DOCUMENTS 6,975,925 B1 * 12/2005 Barnes .................... F03D 7/048
                                                    700/286
7,580,817 B2 *  8/2009 Bing ....................... G01W 1/10
                                                    703/6

OTHER PUBLICATIONS

A. Zellner and J. Tobias, "A Note on Aggregation, Disaggregation and Forecasting Performance," *Journal of Forecasting*, 19:457-469 (2000).

B. Gnauk, L. Dannecker, and M. Hahmann, "Leveraging Gamification in Demand Dispatch Systems," *Proceedings of the 1st EnDM workshop* (*EDBT 2012*), pp. 103-110 (2012).

(Continued)

*Primary Examiner* — Saif A Alhija
(74) *Attorney, Agent, or Firm* — Klarquist Sparkman, LLP (57) ABSTRACT

Examples of energy forecasting in hierarchical energy systems are provided herein. A global forecast model instance for a hierarchical energy system can be determined through aggregation of energy forecast model data from individual energy smart meters. Energy forecast model data can include values for energy forecast model parameters used by the individual smart meters. The energy smart meters include measurement, forecasting, and calculation capabilities. The smart meters locally determine a forecast model instance used by the smart meter and provide corresponding information to higher levels in the energy system hierarchy. A global forecast model instance is determined based on the provided information.

12 Claims, 8 Drawing Sheets

(56) References Cited

OTHER PUBLICATIONS

D. Agrawal, D. Chen, L. ji Lin, J. Shanmugasundaram, and E. Vee, "Forecasting high-dimensional data," *SIGMOD*, pp. 1003-1012 (2010).

D. Liu and J. Nocedal, "On the Limited Memory BFGS Method for Large Scale Optimization," *Mathematical Programming 45*, 45(3):503-528 (1989).

D. M. Dunn, W. H. Williams, and T. L. DeChaine, "Aggregate Versus Subaggregate Models in Local Area Forecasting" *Journal of the American Statistical Association*, 71:68-71 (1976).

Directorate-General for Research, "Smart grids: vision and strategy for Europe's electricity networks of the future," Report, European Commission (2006).

ENTSO-E—European Network of Transmission System Operators for Electricity. *The Harmonised Electricity Market Role Model* (2011).

ENTSO-E. *Scenario Outlook and System Adequacy Forecast 2011-2025* (2011).

G. Fliedner, "Hierarchical forecasting: issues and use guidelines," *Industrial Management & Data Systems*, 101:5-12 (2001).

General Secretariat of the Council. European Council Feb. 4, 2011: Conclusions. Governmental publication, European Commission (2011).

H. Berthold, M. Boehm, L. Dannecker, F.-J. Rumph, T. B. Pedersen, C. Nychtis, H. Frey, Z. Marinsek, B. Filipic, and S. Tselepis, "Exploiting renewables by request-based balancing of energy demand and supply," In *11th IAEE European Conference* (2010).

I. Pineda and P. Wilczek, "Creating the Internal Energy Market in Europe: A Report by the European Wind Energy Association," Industrial analysis and report, EWEA—European Wind Energy Association (2012).

J. A. Nelder and R. Mead, "A simplex method for function minimization," *The Computer Journal*, 7(4):308-313 (1965).

J. Cohen, B. Dolan, M. Dunlap, J. M. Hellerstein, and C. Welton, "Mad skills: New analysis practices for big data," *PVLDB*, 2(2):1481-1492 (2009).

J. G. D. Gooijer and R. J. Hyndman, "25 years of time series forecasting," *International Journal of Forecasting*, 22(3):443-473 (2006).

J. M. Hellerstein, P. J. Haas, and H. J. Wang, "Online aggregation," In Proceedings of the 1997 SIGMOD, pp. 171-182 (1997).

J. W. Taylor, "Triple Seasonal Methods for Short-Term Electricity Demand Forecasting," *European Journal of Operational Research*, 204(1):139-152 (2010).

J. Wilkes, J. Moccia, and M. Dragan, "Wind in power: 2011 European statistics," Industrial analysis and report, EWEA—The European Wind Energy Association (2012).

L. Dannecker, M. Boehm, W. Lehner, and G. Hackenbroich, "Forecasting evolving time series of energy demand and supply," *15th ADBIS*, pp. 302-315 (2011).

L. Dannecker, R. Schulze, M. Boehm, W. Lehner, and G. Hackenbroich, "Context-aware parameter estimation for forecast models in the energy domain," In 23rd SSDBM, pp. 491-508 (2011).

M. Boehm, L. Dannecker, A. Doms, E. Dovgan, B. Filipic, U. Fischer, W. Lehner, T. B. Pedersen, Y. Pitarch, L. Siksnys, and T. Tusar, "Data Management in the MIRABEL Smart Grid System," In *1st EnDM (15th EDBT)* (2012).

M. Cailliau, J. A. Ogando, H. Egeland, R. Ferreira, H. Feuk, F. Figel, S. G. Jensen, J. Karas, C. Kawann, C. M. Villar, J. McManus, S. Naletto, H. Nosei, A. Poullikkas, J. Sundell, R. Vrolijk, B. Walter, and M. Zoglauer, "Integrating Intermittent Renewable Sources into the EU Electricity System by 2020: Challenges and Solutions," Industrial analysis and report, Eurelectric: Electricity for Europe (2011).

MeRegio Project. http://www.meregio.de/en/, accessed Jan. 31, 2014.

MIRABEL Project. http://www.mirabel-project.eu, accessed Jan. 31, 2014.

Nationalgrid UK. *Metered half-hourly electricity demands*, www-01.ibm.com/software/data/soliddb/, accessed Jan. 31, 2014.

P. G. Brown, "Overview of scidb: large scale array storage, processing and analysis," In SIGMOD (2010).

P. Grosse, W. Lehner, T. Weichert, F. Faerber, and W. Li, "Bridging two Worlds with RICE," In 37th VLDB, pp. 1307-1317 (2011).

P. R. Winters, "Forecasting sales by exponentially weighted moving averages," *Management Science*, pp. 324-342 (1960).

R. H. Byrd, P. Lu, J. Nocedal, and C. Zhu, "A limited memory algorithm for bound constrained optimization, "*SIAM J. Scientific Computing*, 16:1190-1208 (1995).

R. J. Hyndman, A. B. Koehler, R. D. Snyder, and S. Grose, "A state space framework for automatic forecasting using exponential smoothing methods," *International Journal of Forecasting*, 18:439-454 (2002).

R. J. Hyndman, "Another look at forecast-accuracy metrics for intermittent demand," *The International Journal of Applied Forecasting*, (4):43-46 (2006).

R. J. Hyndman, R. A. Ahmed, G. Athanasopoulos, and H. L. Shang, "Optimal combination forecasts for hierarchical time series," *Computational Statistics and Data Analysis*, 55(9):2579-2589 (2008).

R. Ramanathan, R. Engle, C. W. Granger, F. Vahid-Araghi, and C. Brace, "Short-run forecasts of electricity loads and peaks," *Int. Journal of Forecasting*, 13(2):161-174 (1997).

Ren21, "Renewables 2011 global status report," Technical report, Ren21 (2011).

Robert Lorenz, Lars Dannecker, Philipp Rosch, Wolfgang Lehner, Gregor Hackenbroich: Forecasting in Hierarchical Environments; In: Proceedings of the 25th Scientific and Statistical Database Management Conference (SSDBM 2013, Baltimore, ML, USA) (2013).

S. Das, Y. Sismanis, K. S. Beyer, R. Gemulla, P. J. Haas, and J. McPherson, "Ricardo: integrating r and hadoop," *SIGMOD*, pp. 987-998 (2010).

S. Duan and S. Babu, "Processing forecasting queries," In 33th VLDB, pp. 711-722 (2007).

S. Kirkpatrick, C. D. Gelatt, and M. P. Vecchi, "Optimization by Simulated Annealing," *Science*, 220(4598):671-680 (1983).

T. Ge and S. Zdonik, "A skip-list approach for efficiently processing forecasting queries," In 34th VLDB, pp. 984-995 (2008).

T. Jamasb and M. Pollitt, "Electricity market reform in the European union: Review of progress toward liberalization & integration," *The Energy Journal*, 0(Special I):11-42 (2005).

U. Fischer, C. Schildt, C. Hartmann, and W. Lehner, "Forecasting the Data Cube: A Model Configuration Advisor for Multi-Dimensional Data Sets," In *29th ICDE* 853-864 (2013).

U. Fischer, F. Rosenthal, and W. Lehner, "Sample-Based Forecasting Exploiting Hierarchical Time Series," *Proceedings of the 16th IDEAS*, pp. 120-129 (2012).

U. Fischer, M. Böhm, and W. Lehner, "Offline design tuning for hierarchies of forecast models," *14th BTW*, pp. 167-186 (2011).

* cited by examiner

EFFICIENT FORECASTING FOR HIERARCHICAL ENERGY SYSTEMS

CROSS REFERENCE TO RELATED APPLICATIONS

This application claims the benefit of U.S. Provisional Application No. 61/895,347, filed on Oct. 24, 2013 and titled "EFFICIENT FORECASTING FOR HIERARCHICAL TIME SERIES" and U.S. Provisional Application No. 61/895,346, filed on Oct. 24, 2013 and titled "ONLINE FORECASTING FOR SMART ENERGY ANALYTICS," both of which are incorporated herein by reference in their entirety.

BACKGROUND

Energy systems conventionally rely upon forecasting to balance energy production with consumption. Accurate forecasts assist in an accurate balance between energy production and consumption and help to guarantee the stability of energy grids. When an energy system produces energy primarily with conventional energy sources, the energy production can be well matched to the energy consumption. With an increasing share of renewable energy sources, however, accurate forecasting is more challenging. Intermittent renewable energy sources such as wind and solar power can be subject to frequent and strong fluctuations, and their final power output can be difficult to predict beforehand. Energy storage capabilities are typically also rather limited, meaning that energy generated using intermittent renewable energy sources often must be directly used when available.

Forecasts are often calculated using mathematical models that capture a parameterized relationship between past and future values of time series data to express behavior and characteristics of a historic time series. Parameter value estimation for these forecast models is conventionally performed by applying an optimization algorithm and is typically very time consuming due to a parameter search space that increases exponentially with the number of model parameters.

Additionally, many energy systems exhibit a hierarchical data organization, with time series and forecast models on multiple levels. In such cases, the time series may be aggregated along the hierarchy based on dimensional attributes such as location. The forecasting calculation process for hierarchical energy systems can be especially complex because data and entities across hierarchical levels are involved, and it is typically desirable for forecasting to be consistent among them.

DETAILED DESCRIPTION

The examples described herein generally produce efficient, accurate forecasts for hierarchical energy systems. Forecasting is used as the basis for planning production in energy systems. Efficient, accurate forecasts allow a continuous and fine-grained balancing of energy production and consumption in real-time.

Energy forecasting employs mathematical models, referred to as forecast models, that model the behavior and development of historic time series. Example forecast models include autoregressive models such as the multi-equation EGRV model and exponential smoothing models such as Taylor's triple seasonal exponential smoothing model. Forecast models employ a set of parameters, each parameter having a parameter value, to express different characteristics of the time series such as seasonal patterns or trends. For example, the triple exponential smoothing forecast model has the parameters $\alpha$ (alpha), $\beta$ (beta), and $\gamma$ (gamma). For the triple exponential smoothing model, $\alpha$ can be referred to as the "data smoothing factor;" $\beta$ can be referred to as the "trend smoothing factor;" and $\gamma$ can be referred to as the "seasonal change smoothing factor." Each of $\alpha$, $\beta$, and $\gamma$ can have values between 0 and 1. Other forecast models and corresponding parameters are known. A "forecast model instance" refers to a forecast model type (e.g. exponential smoothing) and values for the corresponding parameters. As used herein, "forecast model" may refer to a forecast model type or a forecast model instance. Additionally, although a forecast model type has one or more corresponding forecast model parameters that each can have a value, as used herein, "parameter" may refer to a parameter or a value for the parameter.

Energy forecasts are typically based on time series data that is often hierarchically organized and thus aggregated along the hierarchy levels based on dimensional features. Calculating forecasts in these environments is very time consuming due to ensuring forecasting consistency between hierarchy levels. To increase the forecasting efficiency for hierarchically organized time series, a novel forecasting approach is introduced that takes advantage of the hierarchical organization. The forecast models maintained on the lowest level of the hierarchy are reused to almost instantly create already estimated forecast models on higher hierarchical levels. In addition, a novel hierarchical communication framework is described herein that increases communication flexibility and efficiency. Experiments show significant runtime improvements for creating a forecast model at higher hierarchical levels while still providing a very high accuracy.

Values for energy forecast model parameters can be estimated on a training data set to fit the specifics of the time series by minimizing the forecast error (i.e., difference between predicted and actual values). This estimation is typically conducted using local (e.g., LBFGS) or global (e.g., Simulated Annealing) optimization algorithms. As used herein, "optimization" does not necessarily mean that an optimum or best estimation was reached or attempted.

Instead, "optimization" simply refers to "improvement" or a "better" result. The words "optimization" and "improvement" are used interchangeably. Many energy systems exhibit a hierarchical data organization, with time series and energy forecast models on multiple levels. In such cases, the time series are typically aggregated along the hierarchy based on dimensional attributes such as location.

New technologies such as smart grids and economical measures like real-time energy trading are being employed to address the need for real-time balancing. Research projects such as MIRABEL (Micro-Request-Based Aggregation, Forecasting and Scheduling of Energy Demand, Supply, and Distribution) and MeRegio are developing advanced technologies such as demand response systems and flexible energy requests to further address the challenges of real-time energy balancing. These approaches rely upon the availability of current and accurate forecasts at any point in time.

The novel hierarchical forecasting systems described herein provide constantly available, accurate forecasts by exploiting the hierarchical organization of the energy market to increase the forecasting efficiency. With the emergence and increasing employment of smart grid technology, more and more households are provided with smart meters that are capable of recording and processing current consumption measurements in a fine-grained way. Examples described herein use the data processing capabilities of these smart meters to decentralize the forecasting calculation by deploying forecast models directly to the smart meters of customers. Individual customer forecast model instances reflect and are based upon the energy consumption or production of its respective entity.

Companies on further hierarchy levels can then request the individual customer forecast model instances to form an overall forecast model instance representing the demand of all connected lower level entities. This merging process is several magnitudes less expensive than the (re-)estimation of values for the forecast model parameters. Thus, by using the hierarchical forecasting systems described herein, higher-level entities (for example, balancing companies) are able to rapidly calculate very accurate forecasts, which enable them to balance energy demand and supply in real-time. In addition, the customers also benefit from the additional forecasting capabilities available in their smart meters. The emerging trend of smart building and smart home systems can use these forecasting capabilities to offer enhanced functionalities. Examples are described below with reference to FIGS. 1-8.

Examples of Hierarchical Energy Systems

The European energy market is used here as an example of a hierarchical energy system in which the examples discussed herein can be employed. The European energy market has changed fundamentally since the liberalization of the market in the early nineties. Competitiveness and reliable energy supply are increasingly important ever since. Furthermore, the intensified utilization of renewable energy has affected the structure of the energy market. While in the past, only a few electricity producers ensured energy supply, currently the producer side is getting more and more distributed and diverse. The goal of the structural changes is the creation of a competitive, sustainable and integrated single European energy market by 2014. Due to a hierarchical organization of the energy market, energy data management systems (EDMS) are typically organized accordingly. An example hierarchical EDMS that reflects a simplified version of the target role model for the European energy market is discussed below.

The lowest level nodes are made up by industrial energy producers as well as private and industrial consumers. Furthermore, since private households are also allowed to generate and feed-in electricity into the public grid, there are entities consuming and producing energy at the same time (prosumer, e.g., using solar panels). At this level, smart meters can be used to continuously monitor the amount of consumed or produced energy. Producers, consumers and prosumers are pooled into balance groups, with the goal of balancing the energy consumption and production within these groups. The balance groups are managed by companies called balance responsible parties (BRP). They form the second level of the energy market hierarchy and are also in charge of ensuring that the energy quantity contracted to provide or to consume is equal to the quantity really provided or consumed. The third level comprises the transmission system operators (TSOs). They ensure a stable operation of the grid and the transport of electricity to their final destination.

Examples of Energy Forecasting in Hierarchical Energy Systems

To allow efficient forecasting in hierarchical environments, the hierarchical organization of time series can be exploited and the forecasting process can be decentralized. More specifically, the responsibility to build and maintain a forecast model is pushed to the base level of the hierarchy. In the energy domain this is motivated by the fact that smart meters are expected to be widely deployed, and their available computing capacity can be exploited. In addition to their task of recording current measurements, smart meters gain the capability to predict the future consumption or production of a customer. The employed forecast model instances can be seen as a compact representation of the customer data and in an ideal case the forecast model instance describes values that are identical to the actual time series. While in the real-world, forecast model instances exhibit a certain error, this error is typically reduced with an increasing aggregation level, since in the entirety single fluctuations are neutralized to a large extent. Accordingly, the forecast model instances of the single customers can be transmitted and aggregated to directly determine a global forecast model instance describing the energy consumption and production of the entire group. As used herein, "forecast model" may refer to both a "forecast model type" and a "forecast model instance." A forecast model instance refers to a forecast model type and a particular parameter combination. For forecast model aggregation, the individual forecast model instances being aggregated are typically of the same forecast model type.

Aggregation Overview Examples

Figure 1:
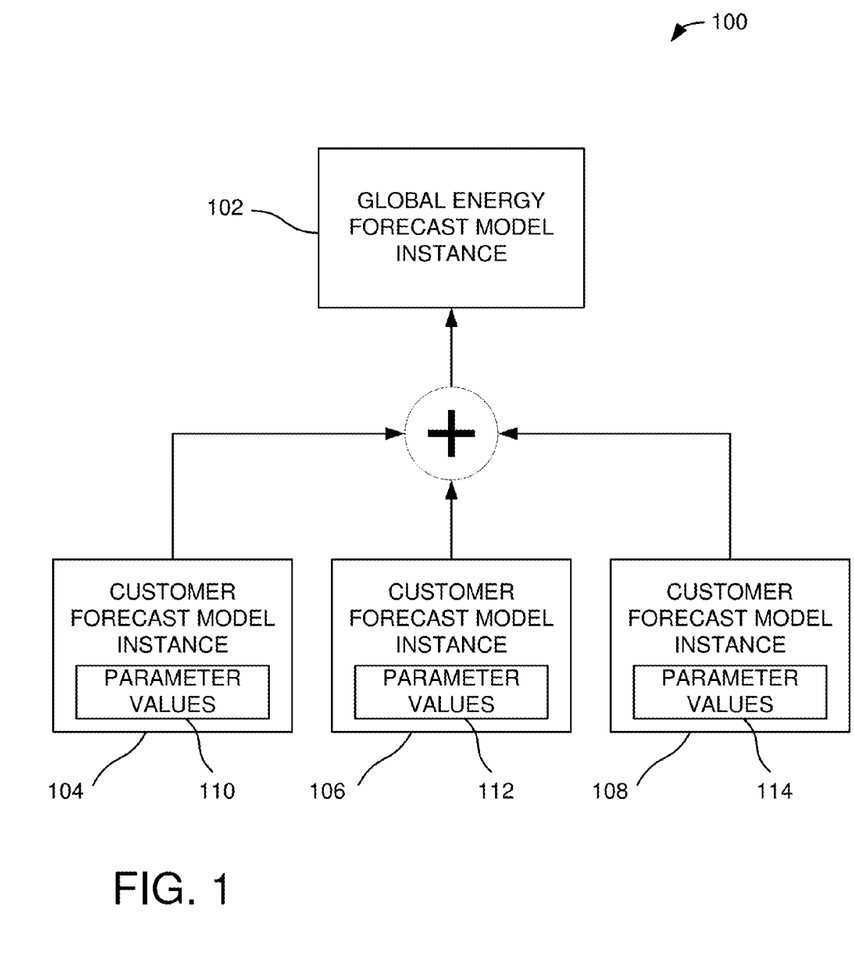
FIG. 1 is a flow chart illustrating an example of forecast model instance aggregation.

FIG. 1 illustrates an example energy forecast model aggregation 100. Global energy forecast model instance 102 is formed based on contributions from customer forecast model instances 104, 106, and 108. Customer forecast model instances 104, 106, and 108 have associated energy forecast model parameter values 110, 112, and 114. Customer forecast model instances 104, 106, and 108 are already optimized such that global energy forecast model instance 102 can be formed through aggregation rather than through performing a computationally and time-intensive global optimization.

Figure 2:
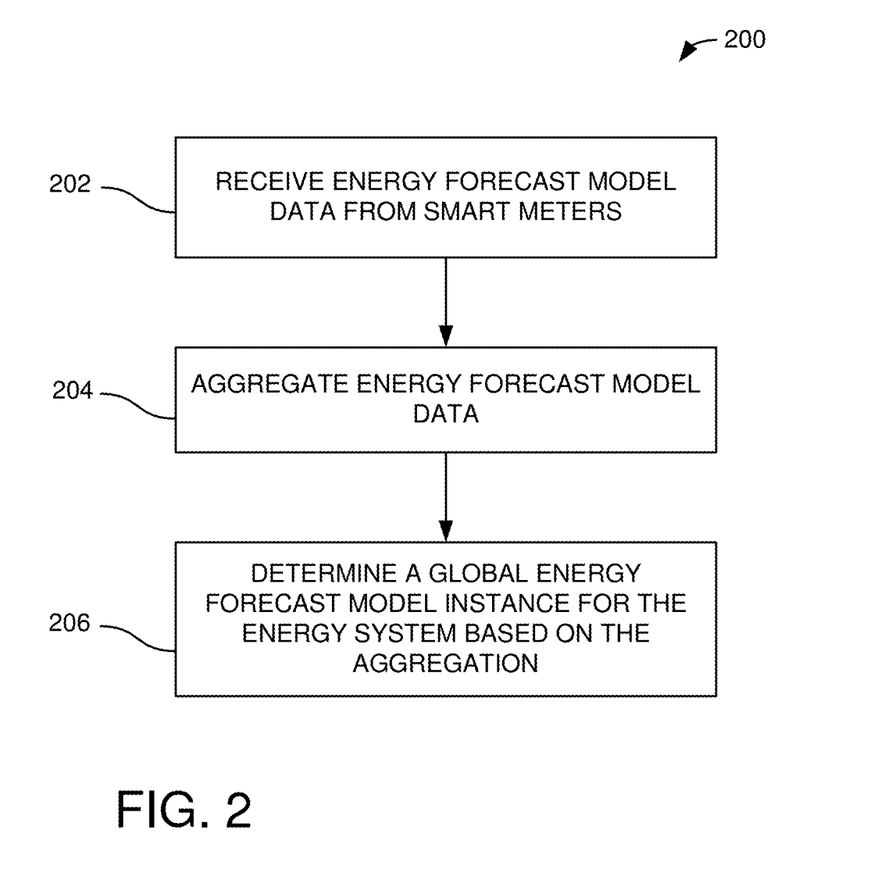
FIG. 2 illustrates an example method of creating a global forecast model for an energy system.

FIG. 2 illustrates a method 200 of creating a global forecast model for an energy system. In process block 202, energy forecast model data is received from a plurality of energy smart meters. Residential and commercial customers can, for example, each have one or more energy smart meters that measure energy usage for that entity. Energy forecast model data for an individual smart meter can include a variety of information, including energy usage, energy production (e.g., for a prosumer), the energy forecast model instance used by the smart meter, values for the energy forecast model parameters of the energy forecast model instance, temperature data, weather data, time data, or other data. The energy forecast model data from the plurality of energy smart meters is aggregated in process block 204. In process block 206, a global energy forecast model instance for the energy system is determined based on the aggregation. A global energy forecast model instance can comprise a plurality of global components each having at least one corresponding global energy forecast model parameter.

As a simplified example, consider two smart meters using a triple exponential smoothing model provide the following energy forecast model data (values for corresponding energy forecast model parameters α, β, and γ): Meter 1 (M1): α=0.5, β=0.5, γ=0.5; Meter 2 (M2): α=0.1, β=0.9, γ=0.3. A global forecast model instance can be formed through simple averaging of the corresponding parameter values (weighting and other variations are described below). Parameter values for the global forecast model instance (G) are then: $\alpha_G=(\alpha_{M1}+\alpha_{M2})/2=(0.5+0.1)/2=0.3$; $\beta_G=(\beta_{M1}+\beta_{M2})/2=(0.5+0.9)/2=0.7$; and $\gamma_G=(\gamma_{M1}+\gamma_{M2})/2=(0.5+0.3)/2=0.4$.

Aggregation can be performed in a variety of ways. In some examples, aggregation comprises separately aggregating energy forecast model data corresponding to the respective global components. Weighting can be used in the aggregation. In some examples, a weighting factor can be calculated for each of at least some of the plurality of energy smart meters. The weighting factor can be based on a current share of energy use for the smart meter out of a total energy use for the energy system. The current share for an individual smart meter can be dynamically calculated based on actual usage as compared to actual total system usage. In other examples, the current share of energy use for a smart meter is approximated as an average historical share for the smart meter. In many situations, the historic share for a particular smart meter is relatively constant, and using the average historical share allows the system to save time and computing resources by not calculating an actual share. In some examples, contributions from each smart meter are given approximately equal weight.

The global components can then be determined using the energy forecast model data for the respective individual smart meters and the weighting factors for the respective individual smart meters. For example, the weighting factors can be used to determine the global components through a weighted linear combination. The global energy forecast model instance can also be updated upon receiving updated energy forecast model data from one or more smart meters.

Figure 3:
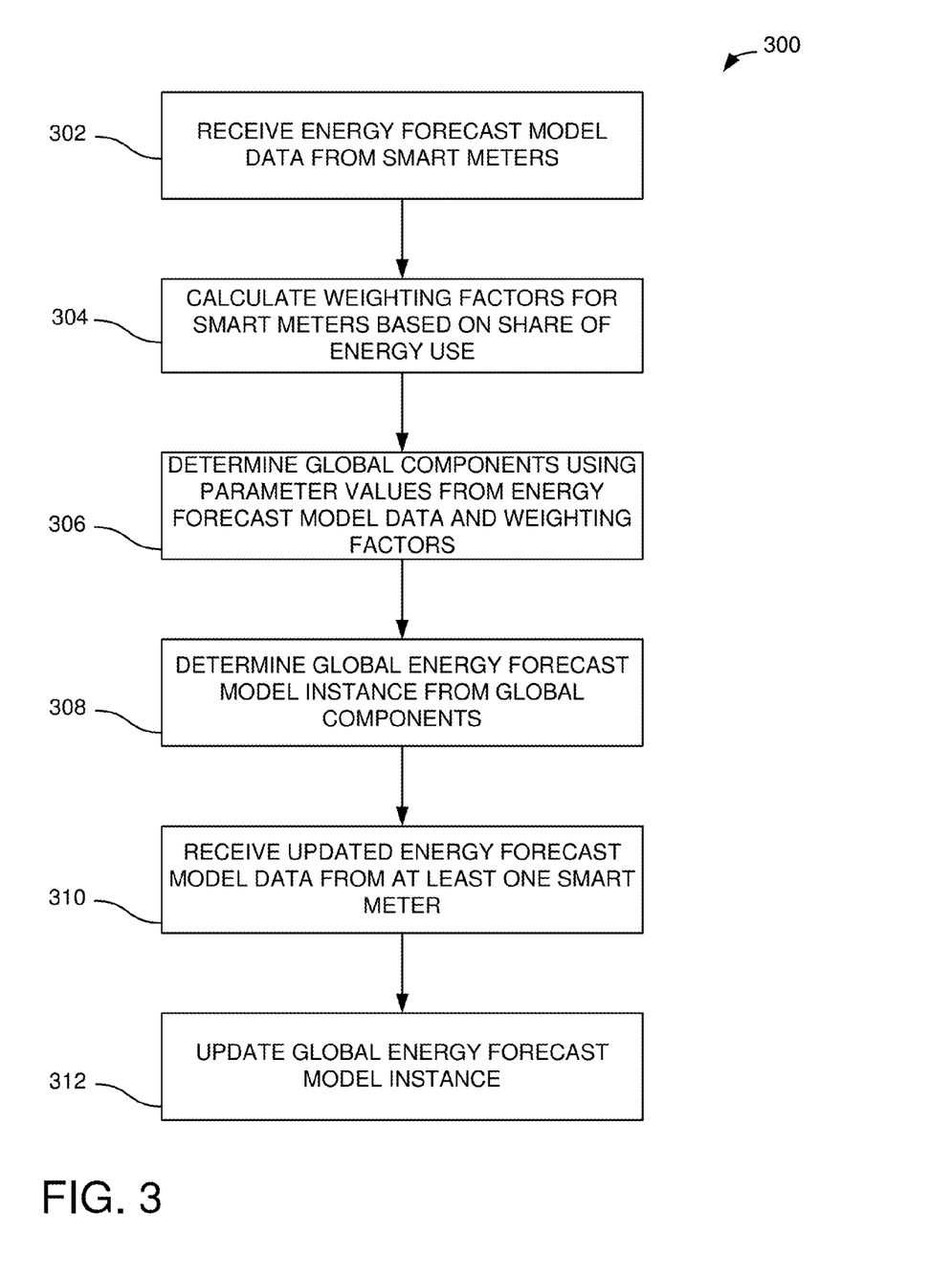
FIG. 3 is an example method of creating a global forecast model for an energy system in which global components are determined using weighting factors and energy forecast model parameters from smart meters.

FIG. 3 illustrates a method 300 in which the global components of a global energy forecast model instance are determined using weighting factors. In process block 302, energy forecast model data is received from a plurality of energy smart meters. In process block 304, weighting factors are calculated for the individual smart meters based on the respective smart meter's energy use as a share of the total system use. The share can be, for example, a current share or a historical average share. In process block 306, a plurality of global components are determined using energy forecast model parameter values from the received energy forecast model data and the calculated weighting factors. A global energy forecast model instance is then determined in process block 308 using the global components.

In process block 310, updated energy forecast model data is received from one or more of the plurality of energy smart meters. Over time, various factors can cause the forecast model instance being used by an individual smart meter to become less accurate. For example, the nature of the energy use of the entity being measured by the smart meter can change and external conditions such as temperature and daylight can change. In some examples, the individual smart meter calculates a forecast error for a current energy forecast model instance and compares the error to a forecast error threshold. Upon determining that the forecast error meets or exceeds the forecast error threshold, the current energy forecast model instance is updated, and updated parameter values and/or other information associated with the updated energy forecast model instance are communicated by the smart meter. The current energy forecast model instance can be updated by the smart meter by, for example, applying one or more optimization algorithms. In process block 312, the global energy forecast model instance for the energy system is updated to reflect the received updated energy forecast model data. In some examples, the underlying global components upon which the global energy forecast model instance is based can each be updated.

Examples of Classification of Forecast Model Coefficients and Parameters

In some examples, aggregating forecast models involves considering forecast model coefficients and their corresponding parameter values. Coefficients (e.g., "x") represent actual time series values. In some examples, coefficients can be divided into endogenous and exogenous coefficients depending on their characteristics and their handling on the next hierarchy level. Endogenous coefficients describe the main time series that is aggregated through the hierarchical levels: $x=\Sigma_{k=1}^{K}x_k$. In the energy domain, for example, a typical endogenous coefficient is energy consumption. In contrast, exogenous coefficients are not directly connected to the main time series and instead describe an external influence. They can be either entity-specific or valid for larger entity groups. Exogenous coefficients can occur as additional time series or dummy variables, where dummy variables simply distinguish between existence or non-existence of a fact using the values 0 or 1. When using an additional time series, the external influence can be determined by the external time series value and the corresponding parameter. In contrast, when using dummy variables the external influence of the coefficient can be reflected entirely by the value of the parameter. Typical examples for this coefficient group are the current day of the week (dummy variable, e.g., Monday=0 or 1) or the temperature (additional time series, e.g., temperature at customer k is 15° C., parameter is 1.2, temperature increases forecasted value by 18). External influences are typically aggregated by using the average of all values:

$$x = \frac{1}{k}\sum_{k=1}^{K} x_k.$$

Typical exogenous coefficients from the energy domain include calendar information such as the day, week, month, or year. This information is typically the same for most or all entities and can be incorporated as dummy variables. Weather information such as wind speed, temperature, and cloudiness is also a typical exogenous coefficient. The weather situation is often the same for a large group of entities, depending on their local distribution. Weather data can be incorporated as an additional time series. Special events such as sport events, political decisions, and holidays can also be exogenous coefficients. Special events are mostly the same for a large number of entities, but their influence can vary greatly between entities. Special events can be represented as dummy variables.

Common endogenous coefficients include consumption and production. This is typically the main time series when predicting energy demand and supply. Seasons are also an endogenous coefficient. They consider historic time series values in a specific distance from the current point in time (e.g., one day). Past errors, such as the historic forecast error that describes the deviation of the forecast from the real time series, are also endogenous.

Exogenous and endogenous coefficients can be considered differently when determining the final aggregated forecast model (global forecast model instance). Separate aggregation rules can thus apply for each coefficient group. In addition, the final influence of the coefficient groups can be varying between forecasting points in time and can be entity specific. These variations can be automatically addressed during the parameter estimation by increasing or decreasing parameter values of the respective group. However, using the hierarchical forecasting approach, values for the forecast model parameters are typically not (re-)estimated, and the parameters thus do not typically adapt with respect to the varying group influence. Thus, the aggregation of forecast models incorporating both coefficient groups is addressed.

Examples of Aggregation in Detail

In some examples, creating aggregated global time series $x(t_i)$ on a higher level means to sum the time series of all lower level entities $x_k(t_i)$, with k referring to the k-th customer and t to the current point in time. Accordingly, following the assumption that a forecast model approximately describes its underlying time series, the next level global forecast model $M(t_i)$ can be created by aggregating the forecast model instances of all lower level entities $M_k(t_i)$ as illustrated in Equation 1.

$$x(t_i) = \sum_{k=1}^{n} x_k(t_i) \approx \sum_{k=1}^{n} M_k(t_i) = M(t_i). \quad (1)$$

In the following explanation, the notation $(t_i)$ is omitted for clarity. A forecast model M can be divided into separate components $M(C_1, \ldots, C_n)$, where a model component C is defined as a forecast model coefficient x combined with its parameter p so that $C = p \cdot x$. A linear model $a \cdot x + b$ for example can consist of two model components $a \cdot x$ and b (where the coefficient is 1). To create the global forecast model M, the components $C_k$ of all corresponding lower level forecast models ($M_k$, k∈K) can be separately aggregated, including their coefficients $x_k$ and parameters $p_k$. Accordingly, the calculation of the global forecast model component C, which likewise consists of a global parameter p and a global aggregated coefficient $x = \sum_{k=1}^{K} x\_k$, can be defined as shown in Equation 2.

$$C = p \cdot x = \sum_{k=1}^{K} p_k x_k. \quad (2)$$

Because the aggregated time series of the coefficient x is available to the upper level entity, the remaining factor for calculating a global forecast model component is the global parameter p. Equation 2 can be adapted to define a general aggregation rule for determining the parameter of a global forecast model component (Equation 3). Dividing the single entity time series value $x_k$ by the global aggregated time series coefficient x, as is done in Equation 3, is equivalent to determining the current share of a single entity value on the global value. Thus, the global forecast model parameter p can be derived by creating a linear combination of the single entity parameters multiplied by their share on the global time series.

$$p = \sum_{k=1}^{K} \frac{p_k x_k}{x}. \quad (3)$$

Equation 3 considers the coefficient values of the individual entities $x_k$ and the values of the respective global coefficient x. Thus, the current measurements of the lower level entities would be requested and processed each time the global forecast model is adapted, which can limit the efficiency of communication. To overcome this issue, the current share ($x_k/x$) of an individual entity can be approximated by its average historic share ($\delta$). As the average share of an entity is typically relatively stable over time, it is typically not necessary to recalculate it for every adaptation of the global forecast model. The historic share of an individual entity can be defined in Equation 4 as:

$$\delta_k = \frac{\bar{x}_k}{\sum_{k=1}^{K} \bar{x}_k} \text{ where, } \bar{x}_k = \frac{1}{N}\sum_{i=1}^{N} x_k(t_i). \quad (4)$$

Thus, the average historic share of an entity can be determined as the ratio between the arithmetic mean over a time series sample (1 ... N) of the single entity to the summed arithmetic mean of all entities. The sample size can be configuration-specific. In some examples, a sample size of one day was found to be beneficial. The historic values used to create the average historic share $\delta_k$ can be transmitted in conjunction with the forecast models of individual entities as part of the energy forecast model data. Accordingly, the initial share can be determined during the system initialization, where the higher-level entities receive the forecast models and average historic values from lower level entities. During runtime, the share of an individual entity can be adapted, for example, whenever an adapted forecast model is transmitted. In the energy domain, the determination of the shares is straight forward, because for billing purposes, lower level entities typically transmit their actual measurements once per accounting period. Because this transmission is done asynchronous to the forecasting process, it still increases the communication efficiency compared to transmitting values for every model adaptation. Using $\delta_k$ in Equation 3, the model parameters on the next level can be calculated as a weighted linear combination as shown in Equation 5.

$$p = \sum_{k=1}^{K} p_k \delta_k. \quad (5)$$

The global forecast model can be created by applying an aggregation rule to the components of the model $M(C_1, \ldots, C_n)$. Thus, for aggregating an individual global forecast model component, equation 5 can be plugged into $C=p \cdot x$, resulting in Equation 6.

$$C = \sum_{k=1}^{K} p_k \delta_k x. \quad (6)$$

For exogenous coefficients, Equation 3 can be adjusted to account for the fact that for this coefficient type, customer values are typically averaged instead of summed. Thus, $$x = \bar{x} = \frac{1}{K}\sum_{k=1}^{K} x_k.$$

and the aggregation rule can be expressed as:

$$p = \sum_{k=1}^{K} \frac{p_k x_k}{\bar{x}} = \sum_{k=1}^{K} p_k \sigma_k. \quad (7)$$

This means that the parameters of exogenous coefficients can be scaled by the ratio of the single entity value to the global average value $\sigma = x_k/\bar{x}$. As for endogenous parameters, the current ratio can be approximated by the historic ratio based on entity values communicated during the last forecast model transmission. For exogenous coefficients exhibiting the same value for all or substantially all entities (in most cases dummy variables), the aggregation rule can be further simplified. In such a case the global parameters p can be calculated by simply summing the parameters of the individual lower level entities.

With both aggregation rules, hierarchical forecasting works for models involving either endogenous or exogenous coefficients. In some examples in which both coefficient groups are combined, accuracy was found to be reduced. The reason is a varying influence of each coefficient group that is usually automatically addressed during the conventional parameter estimation. Since parameters are not typically estimated in the hierarchical forecasting approach, this issue can be addressed by introducing an influence weight for each coefficient group. Accordingly, Equations 5 and 7 can be adapted for endogenous coefficients p(end) and exogenous coefficients p(exo) respectively leading to:

$$p(\text{end}) = \omega_1 \sum_{k=1}^{K} p_k \delta_k \text{ and } p(\text{exo}) = \omega_2 \sum_{k=1}^{K} p_k \sigma_k \quad (8)$$

The weights $\omega_1$ and $\omega_2$ are estimated using optimization algorithms, but the estimation of two parameters is computationally very cheap, especially when compared to the large number of parameters typically estimated during conventional forecasting.

With the described hierarchical forecasting approaches, it is possible to create higher-level forecast models without time-intensive parameter estimation. As a result, the described hierarchical forecasting approaches provide a very efficient way for higher-level entities to create accurate global forecast model instances in several orders of magnitudes less time. These approaches not only work between consecutive hierarchical levels, but across all hierarchy levels. Thus, in the energy domain, balance responsible parties (BRP) as well as transmission system operators (TSO) are likewise enabled to rapidly provide accurate forecasts as needed for real-time balancing. In addition, the described hierarchical forecasting approaches enable a more dynamic communication between the entities on both layers. Instead of transmitting values in a fixed interval as typically done in the conventional approach, a lower level entity can initiate an information exchange depending on the accuracy of its forecast model; as long as the base model is up-to-date there may not be a need to exchange information between the hierarchy levels.

Customers can also benefit from the availability of forecast models in their smart meters because smart home and smart building systems can use the forecasting capabilities to provide improved and enhanced functionalities. For example, they can use these models to analyze their consumption and production behavior and even predict their future demand and supply, enabling, for example, use of cheaper pre-paid consumption contracts due to knowing the possible demand in advance. In addition, the single customer forecast models can also be used to more intelligently regulating the building or home environment. Even the usage of concepts such as the MIRABEL flex-offers or other demand-response systems can be better implemented with the availability of local forecasts.

Examples of Energy Smart Meters

Figure 4:
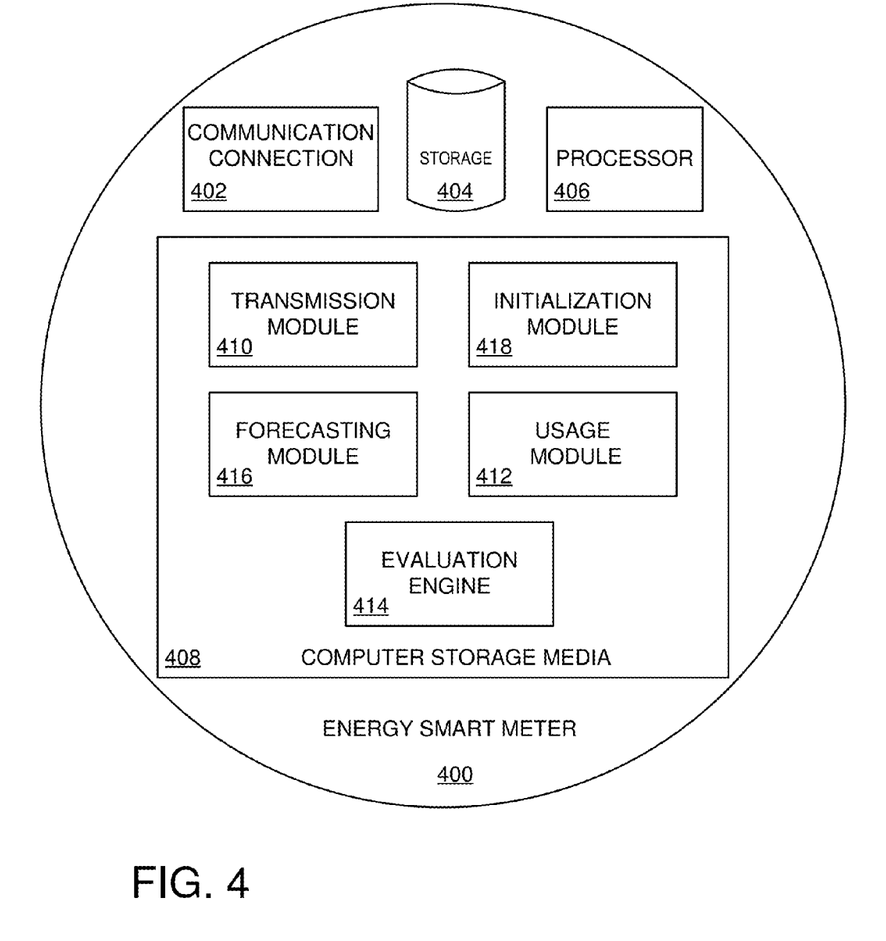
FIG. 4 is an example smart meter having energy forecasting capabilities.

FIG. 4 illustrates an example of an energy smart meter 400. Smart meter 400 comprises a communication connection 402. Communication connection 402 enables communication over a communication medium to another computing entity. Communication connection 402 can comprise various hardware and software components including transmitters, receivers, and antennas. Smart meter 400 also comprises storage 404 and a processor 406. Storage 404 can store a variety of information, including energy usage measurements for smart meter 400, available forecast model types and parameter values, external data such as temperature, cloudiness, etc, and historical data of various types.

Computer storage media 408 stores computer-executable modules that, when executed by processor 406, cause smart meter 400 to communicate within an energy system hierarchy. The modules include transmission module 410, usage module 412, evaluation engine 414, adaptation module 416, and initialization module 418. Transmission module 418 communicates energy forecast model data via communication connection 402. Energy forecast model data comprises one or more values for one or more parameters of an energy forecast model instance used by the smart meter to forecast energy. Energy forecast model data can also include, for example, energy usage, energy production (e.g., for a prosumer), the energy forecast model instance used by smart meter 400, the energy forecast model type, temperature data, weather data, time data, or other data. The energy forecast model data can also include one or more parameter values for an updated energy forecast model instance.

Usage module 412 records energy usage measurements for the smart meter. Energy usage measurements can be recorded at, for example, predetermined intervals of various durations such as every 5 minutes, 10 minutes, 13 minutes, etc. Model evaluation engine 414 assesses the accuracy of a current energy forecast model instance using at least some of the energy usage measurements. In one example model evaluation engine 414 determines a forecast error and compares the forecast error to a forecast error threshold. The forecast error threshold can be a pre-determined threshold selected to balance minimizing calculation frequency and maintaining a high level of forecast accuracy. In some examples, determination of the forecast error is performed at pre-determined time intervals.

Forecasting module 416 determines an updated forecast model instance having increased accuracy and replaces the current energy forecast model instance with the updated forecast model instance. In some examples, forecasting module 416 determines the updated forecast model instance when the determined forecast error meets or exceeds the forecast error threshold. Forecasting module 416 can apply one or more optimization algorithms to determine the updated forecast model instance. The updated energy forecast model instance comprises a same forecast model type as the current energy forecast model instance but at least one different parameter. Forecasting module 416 can also calculate energy forecasts using the current forecast model instance of the smart meter (e.g., the initial forecast model instance and subsequent updated forecast model instances).

Initialization module 418 estimates an initial forecast model instance based on historical consumption data for the smart meter. The initial forecast model instance can be updated by forecasting module 416 as energy usage measurements are acquired and a forecast error is calculated.

Various example smart meters may contain only a subset of the functionality found in transmission module 410, usage module 412, evaluation engine 414, forecasting module 416, and initialization module 418. For example, forecasting module 416 and/or initialization module 418 are omitted in some examples. Additionally, the functionality of the various modules may be distributed or combined in a variety of ways.

Energy smart meter 400 can be used in a hierarchical energy system in which smart meter 400 is one of a plurality of energy smart meters within the energy system hierarchy. In some examples, the respective smart meters use a same energy forecast model type to facilitate aggregation of forecast model instances from the individual smart meters into a global energy forecast model instance for the energy system.

Figure 5:
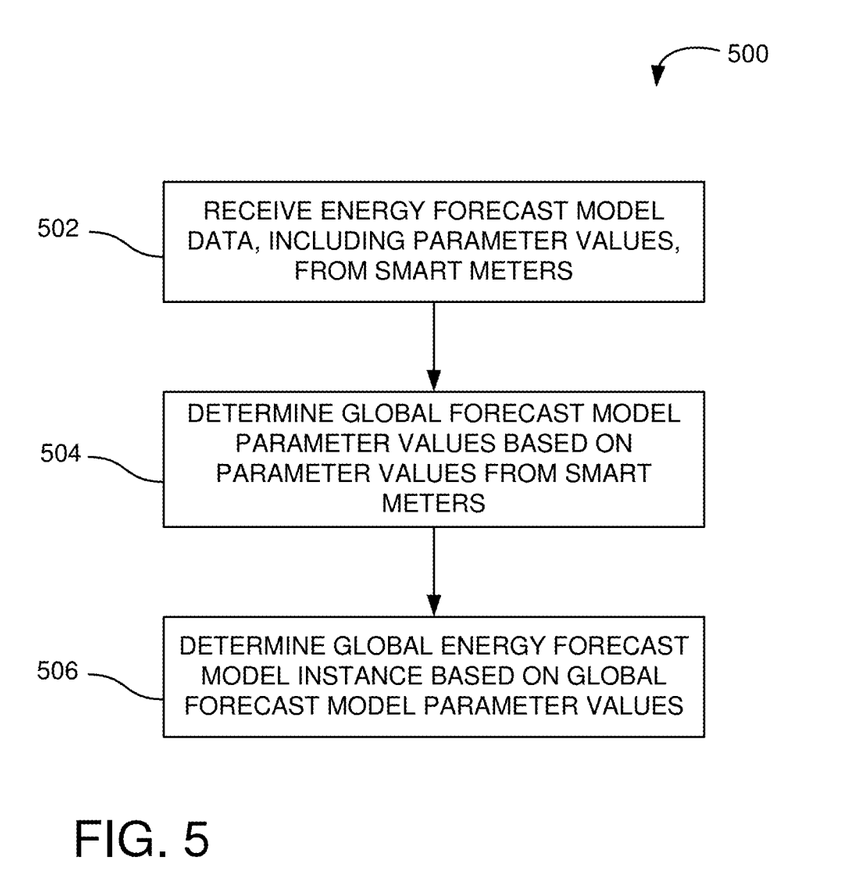
FIG. 5 is an example method of creating a global forecast model for an energy system based on energy forecast model parameters from smart meters.

FIG. 5 illustrates a method 500 of creating a global forecast model instance for an energy system. In process block 502, energy forecast model data for a plurality of energy smart meters such as smart meter 400 in FIG. 4 is received. A respective smart meter forecasts energy use associated with the smart meter using an energy forecast model instance having values for a plurality of energy forecast model parameters. In process block 504, values for the plurality of energy forecast model parameters of the respective smart meters received as part of the energy forecast model data are used to determine values for a plurality of global energy forecast model parameters. A respective global energy forecast model parameter value is based on contributions from corresponding energy forecast model parameter values of the respective smart meters in the energy forecast model data. In process block 506, a global energy forecast model instance for the energy system is determined based on the plurality of global energy forecast model parameter values.

Examples of Hierarchical Communication

Figure 6:
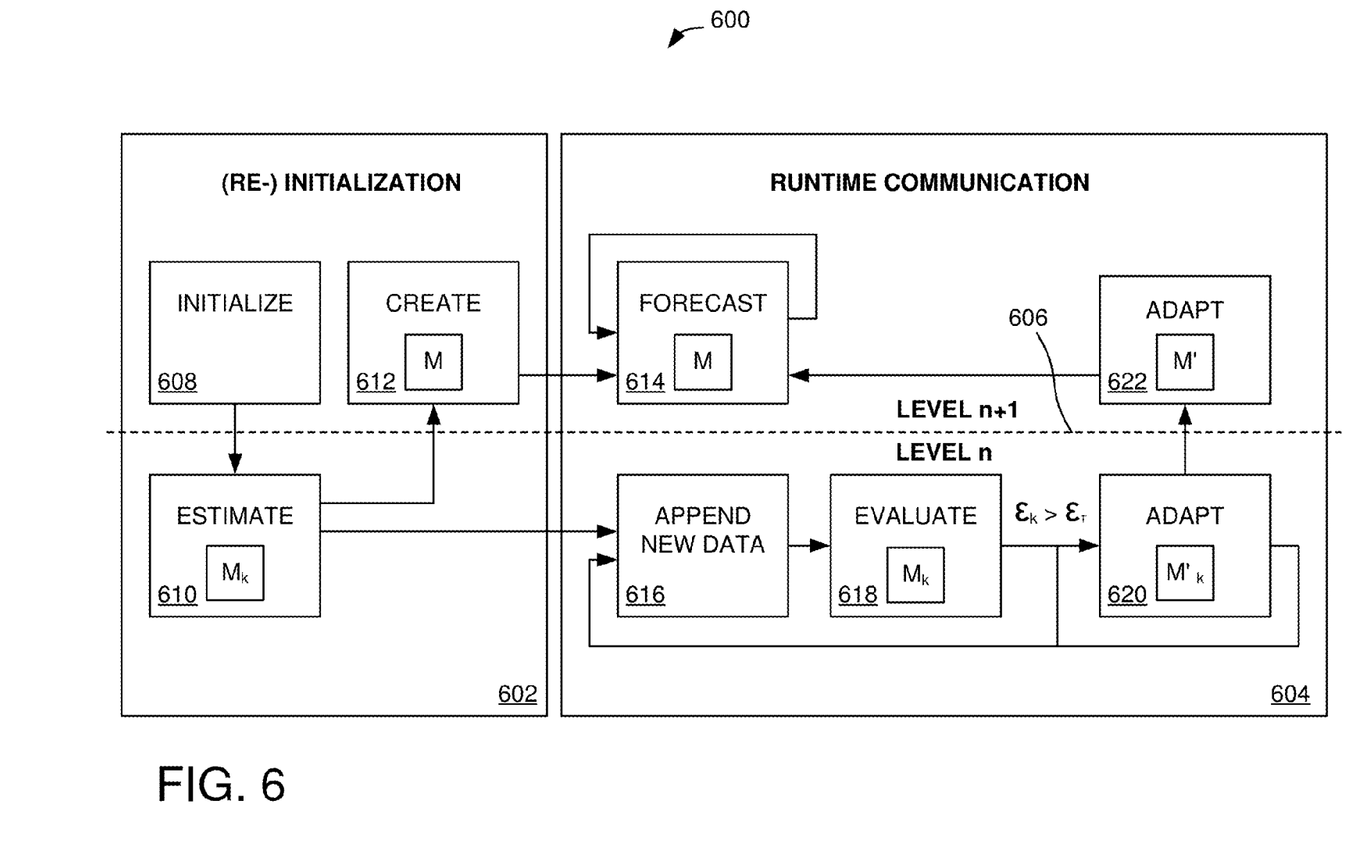
FIG. 6 is an example hierarchical communication process between hierarchical levels.

FIG. 6 illustrates an example hierarchical communication process 600 for transmitting information between the hierarchy levels of an energy system. Conventionally, the lower level entities provided measurements every time a forecast model on a higher level is adapted or in fixed intervals (e.g., every 5 minutes). Process 600 establishes a more flexible communication where information is only transmitted when needed. Process 600 comprises an initialization/re-initialization process 602 and a runtime communication 604. In FIG. 6, dashed line 606 separates a higher level (level n+1) from a lower level (level n) in an energy system hierarchy. Examples with additional hierarchical levels are also contemplated.

Initialization 608 can be conducted when first using process 600 or when a re-initialization is performed (e.g., large organizational changes). During initialization 608, the upper level entity can request the individual forecast model $M_k$ of connected lower level entities. In block 610, the lower level entities estimate their forecast model instances and transmit them to the next level entity. This estimation can be performed, for example, by smart meters such as smart meter 400 of FIG. 4 associated with the lower level entities. Transmitting a forecast model instance in the hierarchical forecasting approach can mean, for example, to transmit a vector containing the values of all forecast model parameters in a predetermined order. The higher-level entity can aggregate the transmitted forecast model instances and with that can create the initial global forecast model M as shown in block 612.

After the initialization/re-initialization process 602, runtime communication process 604 begins. While the higher-level entity uses the global forecast model M for calculating forecasts in block 614, the lower level entities append new measurements to their time series in block 616. The new values can be used to evaluate the accuracy of the individual forecast models $M_k$ in block 618. This can be performed continuously until the forecast error $\epsilon_k$ meets or exceeds a specified error threshold $\epsilon_T$. Afterwards, the forecast model of the specific entity can be adapted in block 620, and the adapted forecast model $M_k'$ can then be transmitted to the next level entity. The adapted model can be used to incrementally adapt the global forecast model M in block 622.

Using the energy demand as an example, and assuming that all or substantially all of the households of a certain city (level 1) are pooled in a balance group, managed by a utility company serving as a balance responsible party (level 2, BRP), hierarchical forecasting works as follows. For the initialization, all households estimate their forecast model instances based on their historical consumption data. The households then transmit their initial model instances to the BRP. The BRP aggregates all individual forecast model instances to create a global forecast model instance describing the historic and future energy demand of the entire balance group. The smart meters of the individual customers record current measurements and adapt the forecast model instances when the accuracy threshold $\epsilon_T$ is exceeded. When a household adapts its forecast model, the adapted model instance is transmitted to the BRP. The BRP picks up the changes and adapts the global model. The new global forecast model instance can be used to predict future values with respect to the most recent changes.

In this example, it is assumed that higher-level entities still have access to the most recent aggregated time series (e.g., balance group consumption). In the energy domain, BRPs can have metering devices at the level of their balance group. Recordings at this level help to guarantee the balancing of energy demand and supply for the entire group. In addition, with an increasing employment of smart grids, TSOs have much finer monitoring capabilities and can also provide information to entities on other levels.

When using the communication processes such as process 600, it is possible to submit the model parameters only when a forecast model is adapted. However, for billing and other purposes it can be useful for the lowest level entities to transmit their consumption and production data once per accounting period. Additionally, these measurements can be used to verify and adapt the average historic share δ (Equation 4). In some examples, instead of transmitting the measurements live, they are communicated asynchronous to forecast model adaptations, when free resources are available. Thus, the described communication processes substantially increase the communication flexibility, while enabling the creation of higher level forecast models without estimating their parameters.

The described communication processes can also work between multiple hierarchy levels in a cascading way. The lowest level entities can provide information to the second level, which can adapt the global forecast model accordingly. The entity on a third level of the hierarchy can be informed by the respective second level entity and so on. In addition, defined communication thresholds can limit the communication effort between hierarchies even further. In such situations, it can be ensured that only significant changes are communicated along the hierarchy and marginal changes are withhold until the defined threshold is reached. The definition of a final communication threshold can be configuration-specific and can depend on the specific use-case. Possible communication thresholds include: the model estimation changed the accuracy by a certain amount; a number of lower level entities transmitted changes; and the forecast model parameters varied by a certain amount.

The described hierarchical communication processes provide an efficient way for exchanging information within a hierarchy. In most cases it is sufficient to just transmit data when changes occurred at the lower level entities. In addition, it is possible to limit the communication effort even further by defining the necessary significance of a change that leads to initiating a communication.

Experimental Evaluation

Two forecast models—the Double Seasonal HWT (DSHWT) and the multiequation EGRV forecast model—were used to experimentally verify that a hierarchical forecasting approach can rapidly calculate accurate results.

The hierarchical forecasting described herein can be used, for example, in: in-memory, column-oriented, relational database management systems for integrated time series forecasting and analytics; in analytics and online analytics processing, for example as an EDM system with an online forecasting process; in smart meter analytics; and in other systems dealing with time series analysis and forecasting. Various conventional techniques typically inefficiently estimate models on all hierarchical levels.

Examples of Implementation Environments

Figure 7:
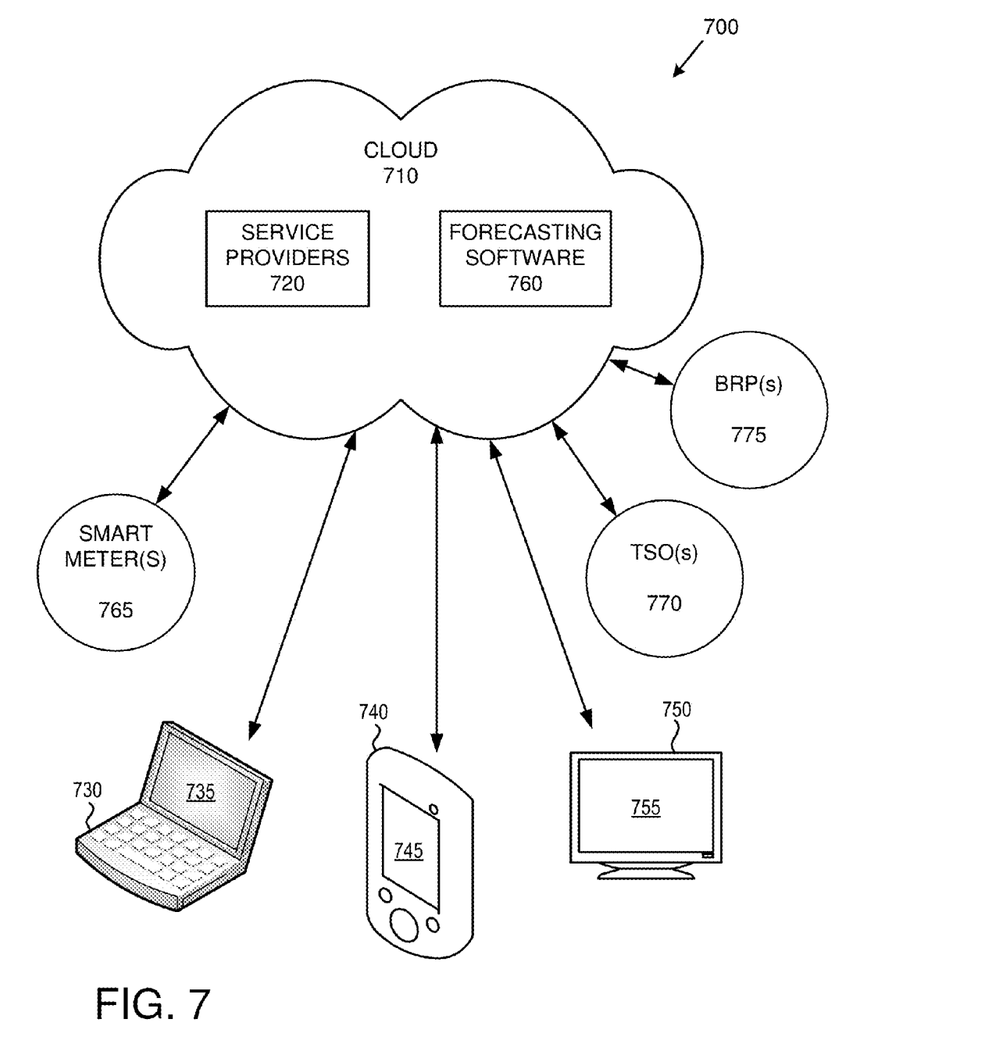
FIG. 7 is a diagram illustrating a generalized implementation environment in which some described examples can be implemented.

FIG. 7 illustrates a generalized example of a suitable implementation environment 700 in which described embodiments, techniques, and technologies may be implemented. In example environment 700, various types of services (e.g., computing services) are provided by a cloud 710. For example, the cloud 710 can comprise a collection of computing devices, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710.

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, or the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touchscreen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users). Cloud 710 can store forecasting software 760 capable of implementing the technologies described herein. Cloud 710 can also be in communication with energy smart meter(s) 765, transmission system operators (TSOs) 770, and balance responsible parties (BRPs) 775.

Examples of Computing Environments

Figure 8:
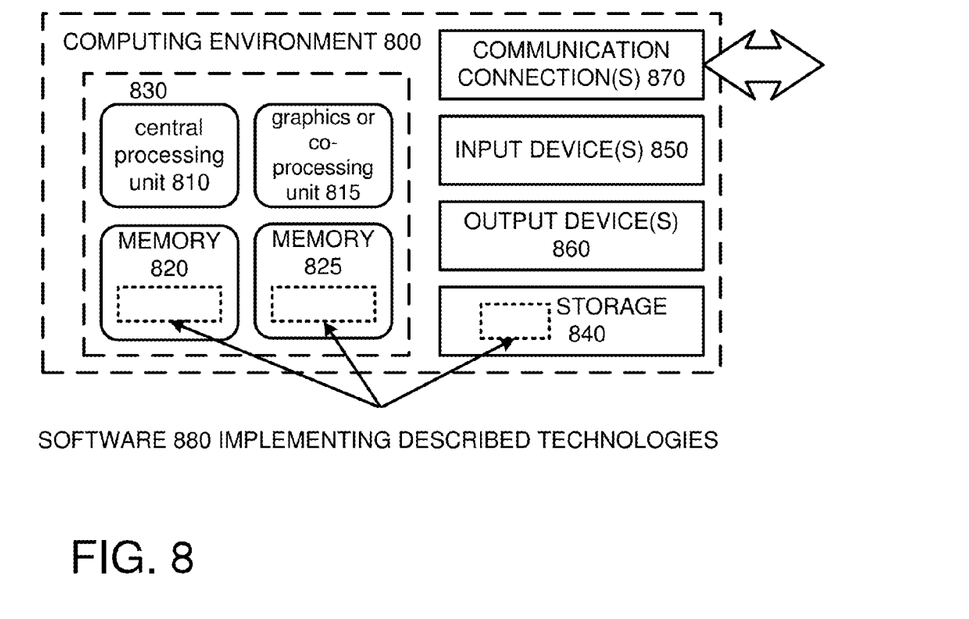
FIG. 8 is a diagram illustrating a generalized example of a suitable computing environment with which some described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 and software 880 can store computer-executable instructions for efficient forecasting in hierarchical environments as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. One or more non-transitory computer-readable storage media storing computer-executable instructions that, when executed, cause a computing system operating a global forecast model instance to perform a method of forecasting energy for a hierarchical energy system, the method comprising:
receiving energy forecast model data from a plurality of energy smart meters, the plurality of energy meters being at a lower level of the hierarchical energy system than the computer system operating the global forecast model instance, wherein the energy forecast model data includes values for a plurality of forecast model parameters that are applied to measured values to provide a forecast, the plurality of forecast model parameters comprising at least a first parameter type and at least a second parameter type, used by the energy smart meters to forecast an amount of energy produced or consumed by one or more consumers, producers, prosumers, or a combination thereof, in communication with, and monitored by, a respective energy smart meter of the plurality of energy smart meters, and wherein the values for the forecast model parameters are determined by the energy smart meters and are used by the energy smart meters to adjust an energy forecast produced by a respective energy smart meter of the plurality of energy smart meters;
separately aggregating the respective forecast model parameters of the first parameter type determined by, and received from, the plurality of energy smart meters;
separately aggregating the respective forecast model parameters of the second parameter type determined by, and received from, the plurality of energy smart meters;
determining the global energy forecast model instance for the energy system based at least in part on the separately aggregated parameters of the first type and the separately aggregated parameters of the second type;
forecasting energy consumption and production for the hierarchical energy system using the global energy forecast model instance; and
adjusting a level of energy production based at least in part on the forecasted energy consumption and production.

2. The one or more non-transitory computer-readable storage media of claim 1, wherein the energy forecast model data for an individual smart meter further comprises at least one of energy usage data for an entity associated with the smart meter, temperature data, or weather data.

3. The one or more non-transitory computer-readable storage media of claim 1, wherein the global energy forecast model instance comprises a plurality of global components each having at least one corresponding global energy forecast model parameter, and wherein the separately aggregated forecast model parameters correspond to the respective global components.

4. The one or more non-transitory computer-readable storage media of claim 3, wherein the plurality of global components are determined using a weighted linear combination.

5. The one or more non-transitory computer-readable storage media of claim 3, wherein the aggregating further comprises:
calculating a weighting factor for each of at least some of the plurality of energy smart meters, the weighting factor based on a current share of energy use for the smart meter out of a total energy use for the energy system; and
for the plurality of global components, determining the global components using the energy forecast model data for the respective individual smart meters and the weighting factors for the respective individual smart meters.

6. The one or more non-transitory computer-readable storage media of claim 1, wherein the aggregating further comprises approximating the current share of energy use for a smart meter as an average historical share for the smart meter.

7. The one or more non-transitory computer-readable storage media of claim 1, wherein the method further comprises:
receiving updated energy forecast model data from one or more of the plurality of energy smart meters; and
updating the global energy forecast model instance for the energy system to reflect the received updated energy forecast model data.

8. The one or more non-transitory computer-readable storage media of claim 7, wherein the updated energy forecast model data represents an updated energy forecast model instance for the corresponding smart meter that was updated when a forecast error for the smart meter exceeded a forecast error threshold.

9. A method of providing a global energy forecast for a hierarchical energy system, the method comprising:
receiving energy forecast model data for a plurality of energy smart meters, the plurality of energy smart meters being located lower in the hierarchical energy system than one or more computing devices providing the global energy forecast, and the energy forecast model data comprising, for respective smart meters of the plurality of energy smart meters, at least a first parameter type and at least a second parameter type, wherein a respective smart meter forecasts energy use associated with the respective smart meter using an energy forecast model instance having a plurality of energy forecast model parameters that are applied to values measured by the smart meter to provide a forecast, comprising the at least a first parameter type and the at least a second parameter type, and wherein the forecast model data for a respective smart meter comprises values for the plurality of energy forecast model parameters that are used by the respective smart meter to forecast an amount of energy produced or consumed by one or more consumers, producers, prosumers, or a combination thereof, in communication with, and monitored by, a respective energy smart meter of the plurality of energy smart meters;
using the values for the plurality of energy forecast model parameters of the respective smart meters of the at least first type and the at least a second type, determining values for a plurality of global energy forecast model parameters, wherein the value for a respective global energy forecast model parameter is based on contributions from values of corresponding energy forecast model parameters of the respective smart meters in the energy forecast model data;

determining a global energy forecast model instance for the energy system based on the plurality of global energy forecast model parameter values;

forecasting energy consumption and production for the hierarchical energy system using the global energy forecast model instance; and adjusting a level of energy production based at least in part on the forecasted energy consumption and production.

10. The method of claim 9, wherein at least some of the global energy forecast model parameter values are determined as weighted linear combinations of the corresponding energy forecast model parameter values of the respective smart meters, and wherein the weighting for a respective smart meter corresponds to a current share of energy use measured by the smart meter out of a total energy use for the energy system.

11. The method of claim 9, further comprising:

receiving updated forecast model data for one or more of the plurality of energy smart meters; and updating the global forecast model instance for the energy system to reflect the received updated forecast model data.

12. The method of claim 11, wherein the updated forecast model data is generated after the one or more of the plurality of smart meters determines that a forecast error for the smart meter exceeded a forecast error threshold.

\* \* \* \* \*